United States Patent [19] [11] 3,888,261
Maurer [45] June 10, 1975

[54] TIME SHARED STIMULATOR

[75] Inventor: Donald D. Maurer, Anoka, Minn.
[73] Assignee: Medtronic, Inc., Minneapolis, Minn.

[22] Filed: Dec. 7, 1973
[21] Appl. No.: 422,896

[52] U.S. Cl. .................... 128/420; 128/421
[51] Int. Cl. .................... A61n 1/36
[58] Field of Search ........ 128/419 C, 419 E, 419 G, 128/419 P, 419 R, 420, 421, 422, 423; 307/115; 328/39; 340/183, 184, 188 CH, 248 D; 343/723, 856, 858

[56] References Cited

UNITED STATES PATENTS

| | | | |
|---|---|---|---|
| 2,838,672 | 6/1958 | Paust | 128/420 |
| 3,563,247 | 2/1971 | Bowers | 128/422 |
| 3,646,940 | 3/1972 | Timm et al. | 128/421 |
| 3,727,616 | 4/1973 | Lenzkes | 128/422 |

OTHER PUBLICATIONS

Glenn et al., "Annals of Surgery" Vol. 172, No. 4, Oct. 1970, pp. 755–765.

*Primary Examiner*—William E. Kamm
*Attorney, Agent, or Firm*—Lew Schwartz; Wayne A. Sivertson

[57] ABSTRACT

A time shared stimulator which employs a single pulse generator to provide non-simultaneous independently controllable multiple outputs. A train of pulses in which the power level of successive pulses may be controlled is produced from the pulse generator output. Switching circuitry connects the pulse train to a series of output electrodes. A trigger signal, which is generated on the trailing edge of each pulse generator pulse, is applied to the switching circuitry to route successive pulses in the pulse train to different ones of the pulse output electrodes.

22 Claims, 3 Drawing Figures

TIME SHARED STIMULATOR

BACKGROUND OF THE INVENTION

The application of electrical pulses to various portions of the body for such purposes as pain alleviation and nerve stimulation is well-known. Such pulses have been applied transcutaneously by external stimulators as well as internally with implantable devices. One form which the implantable devices have taken is an RF-powered implantable stimulator, an example of which is a well-known bilateral dorsal column stimulator used for pain alleviation.

When the pain to be suppressed is diffuse and bilateral, stimulation of the cord dorsum with a single electrode placed off midline several millimeters, was found to be inadequate to abolish bilateral pain in the ipsilateral side. To overcome this problem, a second electrode was added with both stimuli being produced at the same amplitude and time. The resulting bilateral stimulator requires four leads and tends to cause an undesirable cross-stimulus spread of nerve depolarization which may occur when the biological volume conductor is excited at two different sites simultaneously. Also, since the ammplitude difference between causing pain and alleviating pain may be very small, an output amplitude determined by the highest threshold of the two electrode sites was found to have the potential to cause pain or discomfort in the lower threshold electrode site.

SUMMARY OF THE INVENTION

The present invention provides a time shared stimulator in which a train of pulses is produced. These pulses are connected to a plurality of output electrodes by switching circuitry. A trigger signal, which is generated upon the trailing edge of each of the pulses in the pulse train, is applied to the switching circuitry to route successive pulses in the pulse train to successive one of the output electrodes.

From this it can be seen that the difficulties resulting from the simultaneous stimulation of the prior art devices is eliminated by providing a stimulator in which the stimuli are non-simultaneous. In addition, the present invention provides a means for independently regulating the power level of alternate pulses in the pulse train such that the pulses applied to each of the electrodes can be independently regulated thereby enabling an adjustment of the stimulation applied to a certain site in conformity with the threshold of that site. Also, the present invention may be operated as an RF-powered implantable stimulator in which the amplitude of each stimuli may be remotely adjusted through an RF link. The stimulator of the present invention requires only three leads to operate in a dual bipolar electrode mode and may be operated as a dual isolated output monopolar system.

The many objects, advantages and novel features of the present invention will become apparent from the following detailed description of the invention when considered in conjunction with the accompanying drawings.

DETAILED DESCRIPTION OF A PREFERRED EMBODIMENT

Figure 1:
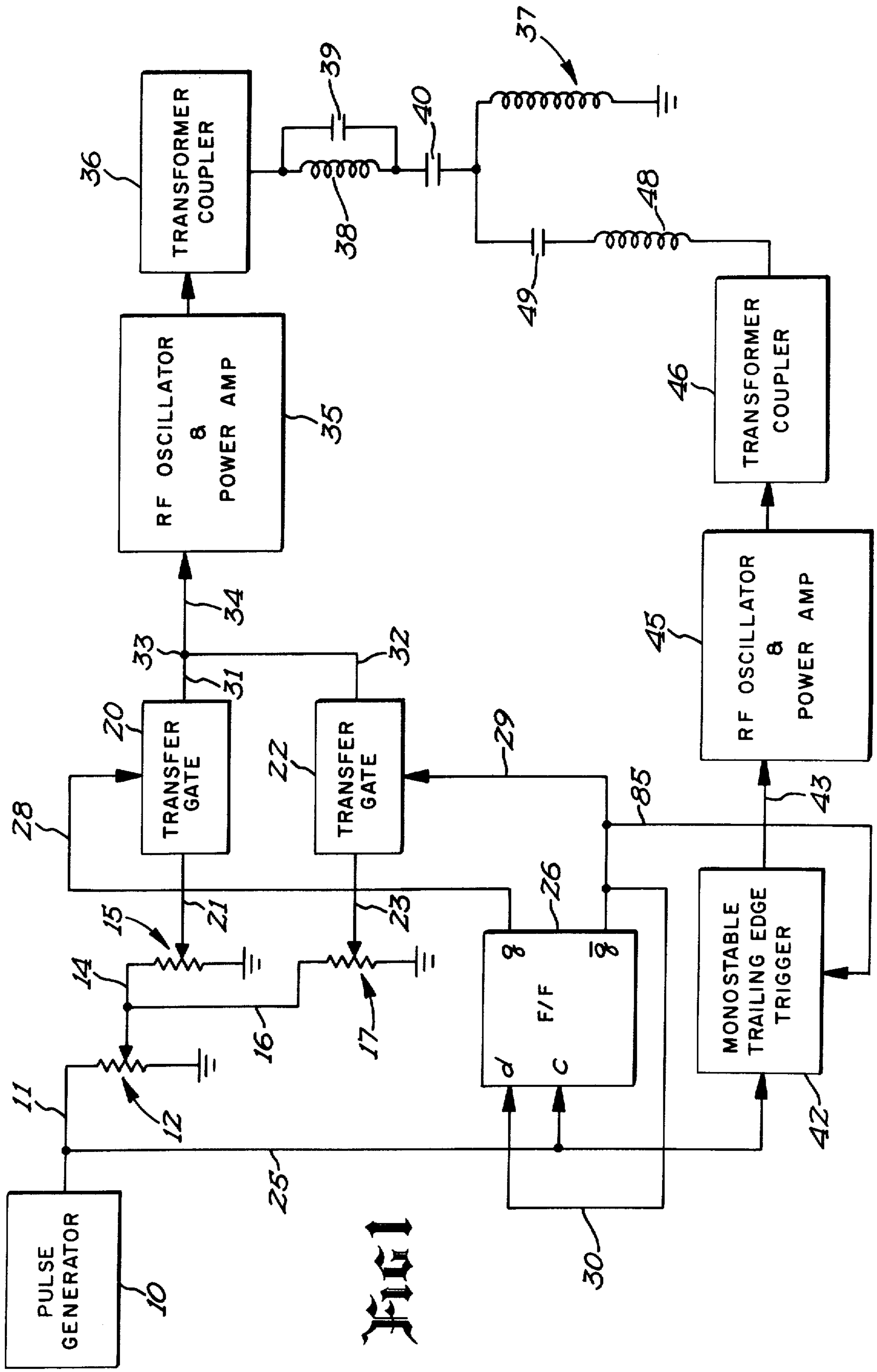
FIG. 1 is a block diagram of a transmitter which may be employed to practice the present invention.

FIG. 1, which is a preferred embodiment of a transmitter which may be used to practice the present invention, shows a pulse generator 10 which generates pulses at twice the desired stimulation rate for reasons to be more fully explained below. The pulse generator may be of any known type which is capable of operating within the required restraints all of which are well-known in the prior art.

The output of the pulse generator 10 passes over a first line 11 to a variable resistance 12. The variable resistance 12 regulates the ultimate limit in all the resulting stimuli in a manner which will become apparant. The output of the variable resistance 12 is transmitted over a line 14 to a second variable resistance 15 and a line 16 to a third variable resistance 17. The variable resistances 15 and 17 along with the variable resistance 12 are well-known in the art and are capable, independently of each other, of regulating the power level of the pulses leaving them by regulating the voltage amplitude of those pulses through variations in their resistances. Other known devices may be substituted for the resistances 15 and 17 so as to alter any characteristic or parameter of the pulses, pulse width or shape, for example. The output of variable resistance 15 is transmitted to a transfer gate 20 through a line 21 and the output from variable resistance 17 is transmitted to a second transfer gate 22 through a line 23.

The output from the pulse generator 10 is also transmitted through a line 25 to the *c* input terminal of a flip-flop 26. The flip-flop 26 has its *q* output terminal connected to the transfer gate 20 by a line 28 while a second line 29 connects the flip-flop $\bar{q}$ output terminal to the transfer gate 22. A feedback line 30 connects the $\bar{q}$ output terminal and the d output terminal of the flip-flop 26. Transfer gates 20 and 22 are connected through their respective output lines 31 and 32 to a junction 33.

Transfer gates 20 and 22 and flip-flop 26 all receive every pulse generated by pulse generator 10. Flip-flop 26 alternates high and low on its output terminals *q* and $\bar{q}$ on every other pulse which causes transfer gates 20 and 22 to alternate their outputs and thus generate a train of pulses at the junction 33. Each pulse of the pulse train generated at the junction 33 has a pulse width and repetition rate identical to the output from the pulse generator 10. However, because of the independent regulation of the variable resistances 15 and 17 the amplitude of alternate pulses in the pulse train generated at the point 33 may be controlled independently at each other.

The pulse train generated at the point 33 is transmitted over line 34 to an RF oscilliator and power amplifier 35. A transformer coupler 36 acts as an impedance matching device to the output circuitry and couples the oscillator 35 to an antenna 37 through an inductance 38 and capacitances 39 and 40 whose functions will be more fully described below.

The output from the pulse generator 10 is also transmitted through line 25 to a monostable multivibrator or trigger 42 which is triggered into its quasi-stable state on the trailing edge of the stimulus pulse from the pulse generator 10. Such monostable multivibrators are well-known and an example of one may be found in Cos/-Mos Integrated Circuit Manual, an RCA Publication, Technical Series CMS-270, on page 115. The output from the multivibrator 42 is transmitted along a line 43 to modulate a second RF oscillator and power amplifier 45, whose output is transformer-coupled at 46, for impedance matching purposes, to the output antenna 37 through an inductance 48 and a capacitance 49.

It has been determined that the above-described RF oscillators 35 and 45 are operational for the purposes of the present invention when the oscillator 35 is operating at 455 KHz and the oscillator 45 is operating at 1.5 MHz, with the inductance 48 and capacitance 49 being series-resonant at 1.5 MHz to provide a low impedance path to the output antenna 37 while being anti-resonant at 455 KHz to prevent loading of the 455 KHz signal generated at the oscillator 35. Also, inductance 38 and capacitance 39 are resonant at 1.5 MHz and provide a high impedance path for the 1.5 MHz signal while the inductance 38 and capacitance 40 are series-resonant at 455 KHz providing a low impedance path to the antenna 37 for the 455 KHz signals.

It is desirable, although not necessary, that there be some form of channel identification in the receiver. With this feature, the amplitude intended for a particular electrode site may be set with the confidence that the electrode at the site will receive its intended signal when the transmitter is reactivated after a shutdown. For this purpose, a line 85 is shown connecting output terminals $\overline{q}$ of flip-flop 26 to the multivibrator 42. Each time $\overline{q}$ is high, this fact will be communicated to multivibrator 42 which will generate a signal which differs from the signal generated when $\overline{q}$ is low in a manner which the receiving circuitry may discriminate. An example of such a difference is a difference in pulse width and such a difference is readily attained through the application of conventional techniques. For example, the state of the signal on line 85 can operate to change the time constant of multivibrator 42 such that the time constant is reduced each time $\overline{q}$ is low.

Figure 2:
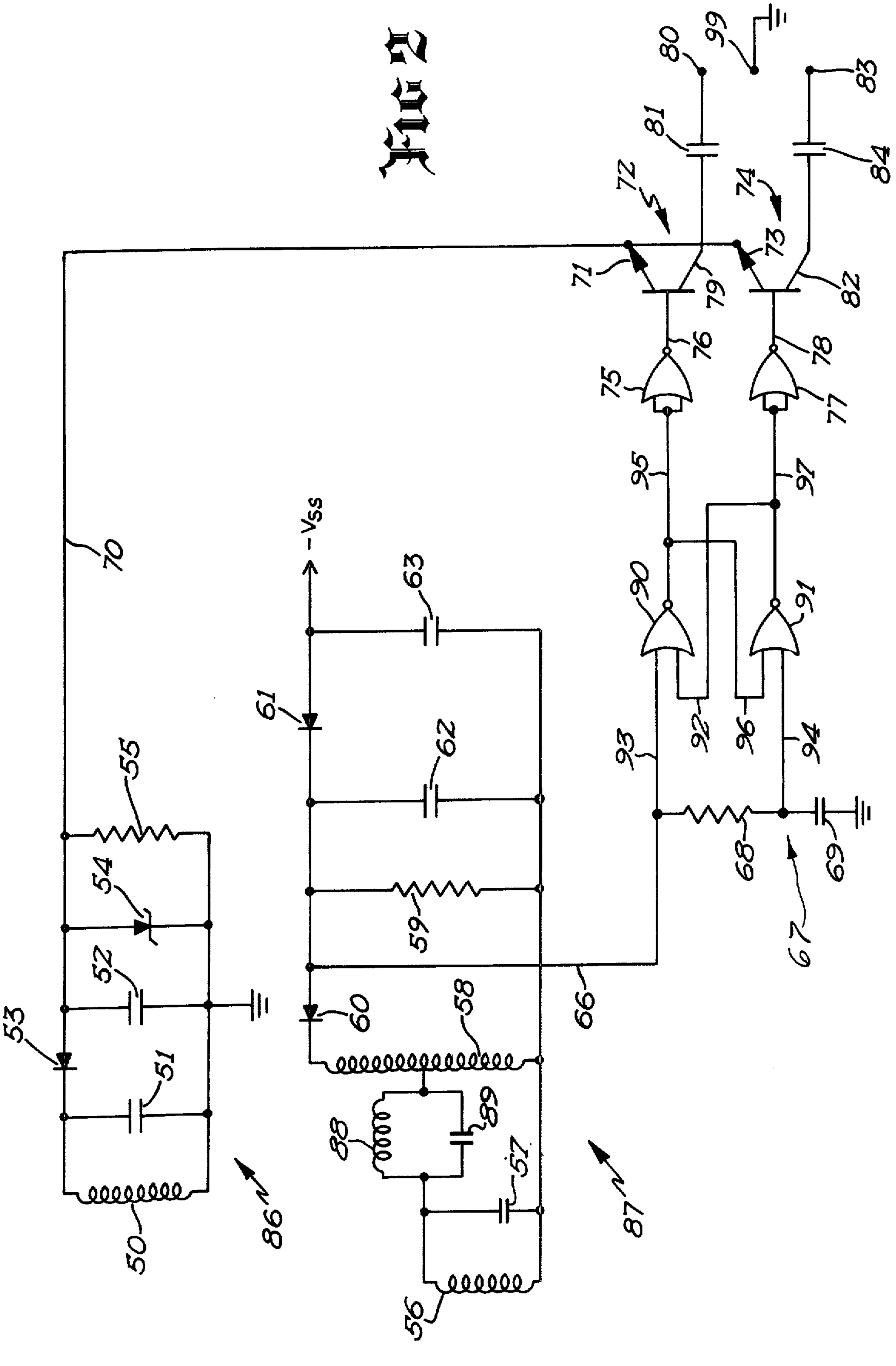
FIG. 2 is a diagram of a preferred embodiment of a receiver which, in conjunction with the transmitter of FIG. 1, may be employed to practice the present invention.

Turning now to FIG. 2, there is shown a two channel receiver which is intended to be tuned to the output of the transmitter of FIG. 1. A stimulus receiver block 86 is comprised of a coil 50, capacitances 51 and 52, diodes 53 and 54 and a resistance 55. The configuration shown at 86 is strictly conventional and well-known in the prior art and develops a negative-going square wave current stimulus assuming that the pulse generator 10 (see FIG. 1) delivers a positive series of pulses.

A gate trigger-RF coupled power supply is shown at 87 and has a first section comprised of coil 56 and capacitance 57 which develop a 1.5 MHz trigger pulse and a tapped coil 58 which matches the impedance of the tuned circuit to its load. A 455 KHz wave trap comprised of an inductance 88 and capacitance 89 acts to prevent high level 455 KHz stimuli from triggering the power supply 87. A second section of the gate trigger-RF coupled power supply is composed of a resistance 59, diodes 60 and 61 and capacitances 62 and 63. The diode 61 and capacitance 63 act as a rectifier/filter and maintain a 10 volt DC ($-V_{ss}$) supply. This power supply is obtained from the 1.5 MHz trigger impulse which is transmitted to the coil 56 and capacitance 57.

The 1.5 MHz trigger signal generated in the gate trigger-RF coupled power supply 87 is tramsitted along a line 66 to a pulse discriminator 67 which, in turn, is connected to a channel routing switch in the form of a latch 98. The pulse discriminator 67 is composed of a resistance 68 and a capacitance 69 which provide a pulse width timing constant to determine which of the pulses on line 66 will set the latch 98. The latch is composed of gates 90 and 91 each of whose output is provided as an input to the other by lines 92 and 96. The gates 90 and 91 are also connected across resistance 68 by lines 93 and 94 while the output of gate 90 is applied as an input to gate 75 over line 95 and the output of gate 91 is applied as an input to gate 77 over line 97. The gates 75 and 77 are buffers for the latch 98. Gate 90 has a lower switching threshold than gate 91.

The 455 KHz signals which are received by the stimulus receiver block 86 produce a train of pulses on a line 70 which is connected to the emitter electrode 71 of a first transistor 72 and the emitter electrode 73 of a second transistor 74. The transistors 72 and 74 provide a switching function under the control of the latch 98. The base electrode 76 of the transistor 72 is connected to the gate 75 while the base electrode 78 of the transistor 74 is connected to gate 77. The collector electrode 79 of transistor 72 is connected to an output electrode 80 through a capacitance 81 while collector electrode 82 of transistor 74 is connected to an output electrode 83 through a capacitance 84. Transistors 72 and 74 provide a low impedance (high conductance) path to their respective electrodes. A common output terminal 99 is provided.

At the trailing edge of each pulse produced on line 70, a trigger pulse is produced on line 66. Recalling that alternate pulses on the line 66 have different pulse width due to the change in the time constant of the multivibrator 42, if the pulse on line 66 is a narrow pulse, capacitor 69 is charged to a level below the switching threshold of gate 91 but greater than the switching threshold of gate 90. This sets the latch causing gate 90 to be "on" thus switching on transistor 72 such that the next pulse appearing on line 70 will be applied to the output electrode 80. Upon the appearance of a wide pulse on line 66, capacitor 69 is charged to a level above the switching threshold of both gates 90 and 91 turning them both "on" during the occurence of the pulse. At the end of the wide pulse, gate 90 goes "off" while the charge staying on the capacitor 69 causes the latch 98 to "latch" thus leaving gate 91 on. In this condition, the next pulse appearing on line 70 will be applied by transistor 74 to output electrode 83. Thus, it can be seen that the latch 98 causes pulses appearing on line 70 to be switched between the output electrodes 80 and 83. Through this technique, the unit may be turned on after shutdown without having to readjust the power level of the pulse at each electrode site in that the power level applied to the electrodes 80 and 83 after shutdown will be the same applied to those electrodes before shutdown.

Figure 3:
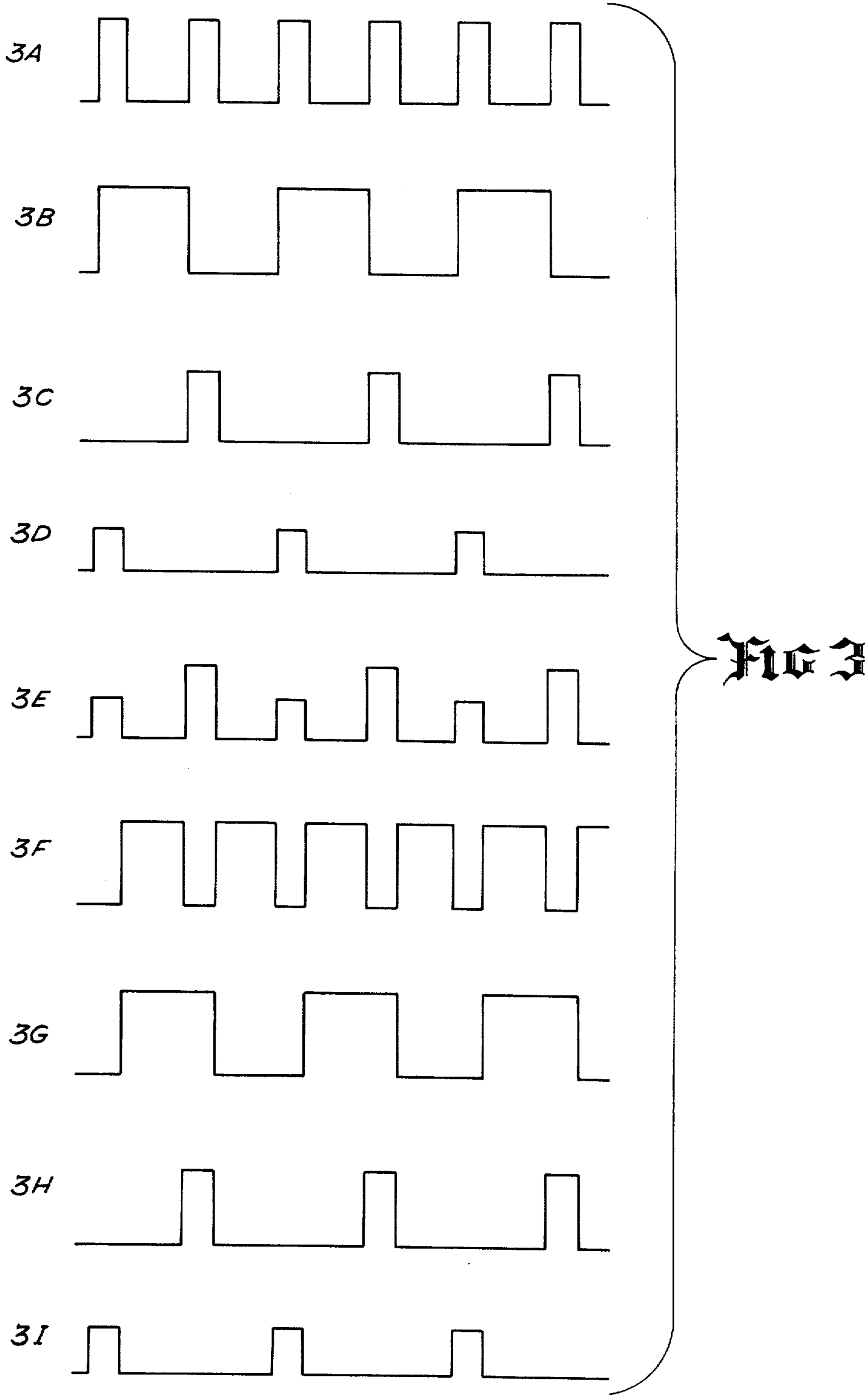
FIG. 3 is a timing chart in which the operating sequence of various elements contained in FIGS. 1 and 2 is illustrated.

The novel features of the present invention as well as the unique cooperation among its several elements will not be explained with reference to FIG. 3 which is a timing chart. It is to be understood that FIG. 3 is in terms of absolute values. That is, there is no attempt to indicate a difference between positive and negative pulses although amplitude differences are included to demonstrate the ability of the present invention to independently regulate the power level of pulses appearing on its several output electrodes.

Line 3A illustrates the pulses generated by the pulse generator 10. As is understood in the art, these pulses have a relatively uniform pulse width, amplitude and repetition rate. These pulses are transmitted to flip-flop 26 whose $q$ output is represented by line 3B. It is obvious, that the $\bar{q}$ output of flip-flop 26 is high when output $q$ is low so the $\bar{q}$ is not shown for the sake of brevity. The pulses shown on line 3A are also transmitted through the variable resistances 15 and 17 to the transfer gates 20 and 22. When the $\bar{q}$ output of flip-flop 26 is high, the signals applied to the transfer gate 22 through the variable resistance 17 will be applied to the point 33. These signals are represented by line 3C. Conversely, when the $q$ output of flip-flop 26 is high, the signals from the variable resistance 15 will be transmitted by the transfer gate 20 to the point 33. These signals are represented by the line 3D.

Line 3E is representative of the combined signals from the transfer gates 20 and 22 as they exist at the point 33 as well as the 455 KHz signal transmitted by the antenna 37, received by coil 50 and applied to the line 70.

The monostable trigger 42 will generate a trigger pulse on the trailing edge of each of the pulses from the pulse generator 10. As explained above, alternate pulses have differing pulse widths and these pulses are represented in line 3F. The same line is representative of the 1.5 MHz signal transmitted by the antenna 37, received by the coil 56 and applied to the line 66.

The line 3G is representative of the condition of gate 90. When gate 90 is "on", a signal appearing on line 70 (see line 3E of FIG. 3) will be applied to output electrode 80 as represented on line 3I. Line 3H is representative of the condition of gate 91. When gate 91 is "on", a signal appearing on line 70 will be applied to output termina! 83 as represented by line 3I. The timing of the signals is such that only one of gates 90 and 91 is on when a signal appears on line 70.

From the above, it can be seen that a single pulse generator may be used to produce a series of non-simultaneous outputs whose amplitudes are independently adjustable. It is apparent, that the present invention may be practiced without utilizing the RF link disclosed by directly applying the signals generated at point 33 to line 70 and the signal on line 43 to line 66. In many environments, however, the major advantages of the present invention can best be accomplished through the RF link. Also, the monostable multivibrator may produce a trigger signal upon the leading edge of each pulse produced by the pulse generator, it being understood that this leading edge trigger signal may be utilized within the disclosed device for the same purposes as the trailing edge trigger signal through the application of the disclosed techniques. Further, through the application of the disclosed techniques, a series of more than two independent output signals may be produced from a single pulse generator.

An additional modification which may be employed is the provision of a "fail-safe" switch in line 34 of FIG. 1. Such a switch may be on when oscillator 45 is operational. Should oscillator 45 malfunction, the switch would shut off thereby disabling the entire system. An example of such a fail-safe switch which may be used is a transistor switch having its emitter-collector junction connected into line 34 with its base electrode being biased by an ac-dc converter which operates on the output of oscillator 45. It is therefore to be understood that, within the scope of the appended claims, the invention may be practiced otherwise than as specifically described.

What is claimed is:

1. A device for electrically stimulating living tissue which comprises:

$n$ output means adapted for connection to said tissue, $n$ being any integer greater than 1;

means for producing a train of periodic pulses composed of $n$ constituent pulse series, said pulse train producing means including means for independently regulating the power level of the pulses in each constituent pulse series; and means connected between said $n$ output means and said pulse train producing means for routing the pulses of each constituent pulse series to a different one of said $n$ output means.

2. The device of claim 1 wherein said routing means comprises:

means for producing a signal upon one edge of each pulse in said pulse train; and means connected to said signal producing means and connecting said pulse train producing means to each of said output means for routing consecutive pulses in said pulse train to different output means in response to the signal from said signal producing means.

3. The device of claim 2 wherein said signal producing means includes means for producing $n$ discriminable signals, said routing means including means for discriminating between said discriminable signals to route each pulse in a constituent pulse series to the same output means while routing the pulses of different constituent pulse series to different output means.

4. The device of claim 3 wherein said power level regulating means comprises means for regulating the amplitude of the pulses.

5. The device of claim 4 wherein $n$ equals 2 and said one edge is the trailing edge.

6. A time shared stimulator which comprises:

$n$ output means adapted for connection to a living animal body, $n$ being any interger greater than 1;

pulse generator means;

means operatively connected to said pulse generator means for transfoming the pulses generated by said pulse generator means into a train of periodic pulses composed of $n$ constituent pulse series, said pulse transforming means including means for independently regulating the power level of the pulses in each constituent pulse series;

means connected to said pulse generator means for producing a signal upon one edge of each pulse generated by said pulse generator means; and means operatively connected to said pulse transforming means and responsive to said signal producing means for routing consecutive pulses in said pulse train to different output means.

7. The time shared stimulator of claim 6 wherein said signal producing means includes means for producing $n$ discriminable signals, said routing means including means for discriminating between said discriminable signals to route each pulse in a constituent pulse series to the same output means while routing the pulses of different constituent pulse series to different output means.

8. The time shared stimulator of claim 6 wherein said power level regulating means comprises means for regulating the amplitude of the pulses.

9. The time shared stimulator of claim 8 wherein *n* equals 2 and said one edge is the trailing edge.

10. The time shared stimulator of claim 9 wherein the pulses of said constituent pulse series alternate with each other, said signal producing means including means for producing alternating discriminable pulses and said routing means including means for discriminating between said discriminable pulses to route the pulses of each constituent pulse series to a different one of said output means.

11. A time shared stimulator which comprises:

pulse generator means;

first means connected to receive the pulses from said pulse generator means for controlling the power level of said pulses;

second means connected to receive the pulses from said pulse generator for controlling the power level of said pulses independently of said first means;

means operatively connected to said first and second means for producing a train of pulses in which pulses from said first means alternate with pulses from said second means;

first and second output means adapted for connection to a living animal body; and means connected between said pulse train producing means and said output means for alternately routing pulses in said pulse train between said first and second output means.

12. The time shared stimulator of claim 11 wherein said first and second power level controlling means comprise means for controlling pulse amplitude.

13. Time shared stimulator of claim 12 wherein said routing means comprises:

means for producing a signal upon one edge of each pulse in said pulse train;

means connected to said signal producing means and connecting said pulse train producing means to each of said output means for routing alternate pulses in said pulse train between said first and second output means in response to the signals from said signal producing means 14. The time shared stimulator of claim 13 wherein said one edge is the trailing edge.

15. The time shared stimulator of claim 13 wherein said signal producing means includes means for producing alternating discriminable pulses, said routing means includiing means discriminating between said discriminable pulses for routing pulses controlled by said first power level controlling means to said first output means and pulses controlled by said second power level controlling means to said second output means.

16. A time shared stimulator which comprises:

pulse generator means;

first means connected to receive the pulses from said pulse generator means for controlling the power level of said pulses;

second means connected to receive the pulses from said pulse generator for controlling the power level of said pulses independently of said first means;

means connected to said first and second means for generating a train of pulses in which pulses from said first means alternate with pulses from said second means;

means for transmitting a signal representative of said pulse train;

means for receiving said pulse train signals;

first and second output means adapted for connection to a living animal body;

means connected to said pulse train signal receiving means and said output means for switching said received pulse train signals between said output means;

means connected to said pulse generating means for generating a pulse upon one edge of each pulse from said pulse generator means;

means for transmitting a signal representative of said edge pulse;

means for receiving said edge pulse signal; and means connected to said switching means and said edge pulse signal receiving means for causing said switching means to route alternate pulses in said received pulse train signal between said first and second output means in response to said received edge pulse signal.

17. The time shared stimulator of claim 16 wherein said edge pulse generating means includes means for generating alternating discriminable pulses, said switching causing means including means for discriminating between the discriminable edge pulse signals to cause said switching means to route pulse train signals representative of the pulses from said first power level controlling means to said first output means and signals representative of the pulses from said second power level controlling means to said second output means 18. The time shared stimulator of claim 17 wherein said first and second power level controlling means comprise means for controlling pulse amplitude.

19. The time shared stimulator of claim 16 wherein said edge is a trailing edge.

20. The time shared stimulator of claim 19 wherein said means for generating an edge pulse comprises a monostable multivibrator which is triggered into its quasi-stable state upon the trailing edge of each pulse from said pulse generator means.

21. The time shared stimulator of claim 20 wherein said multivibrator comprises means responsive to said pulse generator means for producing alternating descriminable pulses, said switching causing means including means discriminating between said discriminable signals for causing said switching means to route pulse train signals reepresentative of the pulses from said first power level controlling means to said first output means and signals representative of the pulses from said second power level controlling means to said second output means.

22. In an electronic system for the stimulation of a biological system in a living body of the type having a transmitter for generating transmitted pulses of radio frequency energy through a transmission antenna and having a body implantable receiver for receiving by means of a receiving antenna the transmitted pulses, for transforming the radio frequency energy to stimulation energy, and for applying the transformed pulses to stimulation electrodes attached to the body, the improvement which comprises:

said trasmitter comprises pulse generating circuit means for producing at least first and second alternating pulse series signals, means responsive to each pulse in the first and second pulse series signals for producing a routing signal, means for modulating the first and second pulse series signals with a first carrier frequency signal, means for modulating the routingg signal with a second carrier frequency signal, and output circuit means for combining the first and second modulated pulse series signals and the modulated routing signal and applying the combined modulated signals to the transmitting antenna; and said receiver comprises first and second stimulation electrodes adapted to be attached to the body, and demodulating receiver circuit means responsive to the routing signal for separately applying the first and second pulse series to the first and second stimulation electrodes, respectively, to effect the concurrent reaction and treatment of discrete body tissue.

* * * * *